May 4, 1965

F. J. HAPEMAN 3,181,512

ROTARY INTERNAL COMBUSTION ENGINE

Filed April 22, 1963

INVENTOR.
Fred J. Hapeman
BY
Fred C. Matheny
ATTORNEY

May 4, 1965   F. J. HAPEMAN   3,181,512
ROTARY INTERNAL COMBUSTION ENGINE
Filed April 22, 1963   3 Sheets-Sheet 2

INVENTOR.
Fred J. Hapeman
BY Fred C. Matheny
ATTORNEY

INVENTOR.
Fred J. Hapeman
BY
Fred C. Matheny
ATTORNEY

United States Patent Office 3,181,512
Patented May 4, 1965

3,181,512
ROTARY INTERNAL COMBUSTION ENGINE
Fred J. Hapeman, Chicken, Alaska
Filed Apr. 22, 1963, Ser. No. 274,534
2 Claims. (Cl. 123—16)

My invention relates to a rotary internal combustion engine.

A general object of my invention is to improve and increase the efficiency of rotary internal combustion engines.

Another general object is to provide a rotary internal combustion engine of simple and efficient construction which is not expensive to manufacture.

Another object is to provide a rotary internal combustion engine which operates on a four cycle principle, is light in weight in proportion to the power it is capable of delivering, is economical in its consumption of fuel, and one in which all kinds of vibration including vibration due to starting and stopping of reciprocating parts is substantially eliminated.

Another object is to provide a rotary internal combustion engine having a rotor formed with a tubular axial bearing member into which gassified fuel is introduced and in which said tubular bearing member communicates by outwardly extending passageways in the rotor body with combustion chambers at the periphery of said rotor body, whereby combustion gases enter axially of the rotor and pass outwardly in the rotor to combustion areas at the periphery of the rotor.

Other objects of my invention will be apparent from the following description taken in connection with the accompanying drawings.

In the drawings FIGURE 1 is a detached sectional view through the axial portion of my engine, taken substantially on broken line 1—1 of FIG. 2, parts being shown in elevation.

Figure 1:
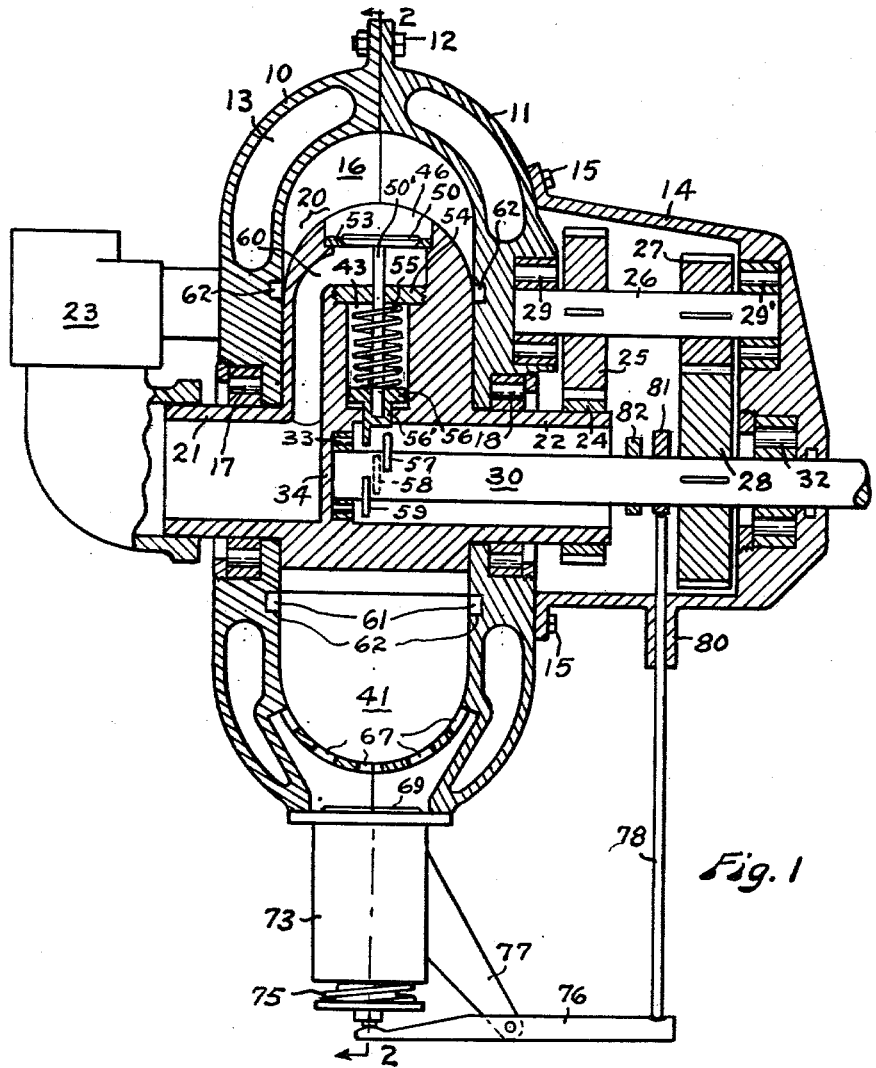

FIGS. 4 to 7 inclusive are diagrams illustrative of the cycle of operation of my engine.

Like reference numerals refer to like parts throughout the several views.

My engine comprises a main housing, preferably formed of two dish shaped flanged housing members 10 and 11 secured together by bolts 12 and provided with water jacket spaces 13 for cooling purposes. A gear housing 14 is secured by cap screws 15 to the housing member 11. The two dish shaped housing members 10 and 11 cooperate to form within them a rotor chamber 16 which has an inner peripheral wall of semi-spherical cross section, considered in a radial plane of the housing.

The hub portions of the two housing members 10 and 11 are suitable recessed to receive aligned bearings 17 and 18, which preferably are of a rolling contact type. A rotor comprising a circular body portion 20 and two coaxial tubular shanks 21 and 22 is disposed within the rotor chamber 16. The shanks 21 and 22 are rotatively received within the respective bearing members 17 and 18. A carburetor 23, or other suitable source of supply of gassified fuel, is communicatively connected with the tubular rotor shank 21.

The tubular rotor shank 22 has a fixedly attached gear 24 which meshes with a gear 25 on a countershaft 26. The countershaft 26 is journaled by bearings 29 and 29' respectively in the rotor housing member 11 and gear housing 14. Another gear 27 on the countershaft 26 meshes with a gear 28 on a main shaft 30. The main shaft 30 also functions as a cam shaft. The sizes of the four gears 24, 25, 27 and 28 is such as to provide a two to one gear ratio between the rotor 20 and the main shaft 30 with the main shaft 30 rotating in the same direction as the rotor 20 and at one half the angular speed of said rotor 20. This two to one gear ratio between the rotor and the main shaft 30 is desirable to facilitate operation of the motor on the four cycle principle, as hereinafter explained.

The outer end portion of the main shaft 30 is journaled in a bearing 32 in the gear housing 14. Said main shaft 30 is disposed coaxially of the tubular rotor shank 22 and has its inner end journaled in a bearing 33 in a hub part 34 of the rotor 20. The hub part 34 also functions as a partition between the tubular shanks 21 and 22.

Figure 2:
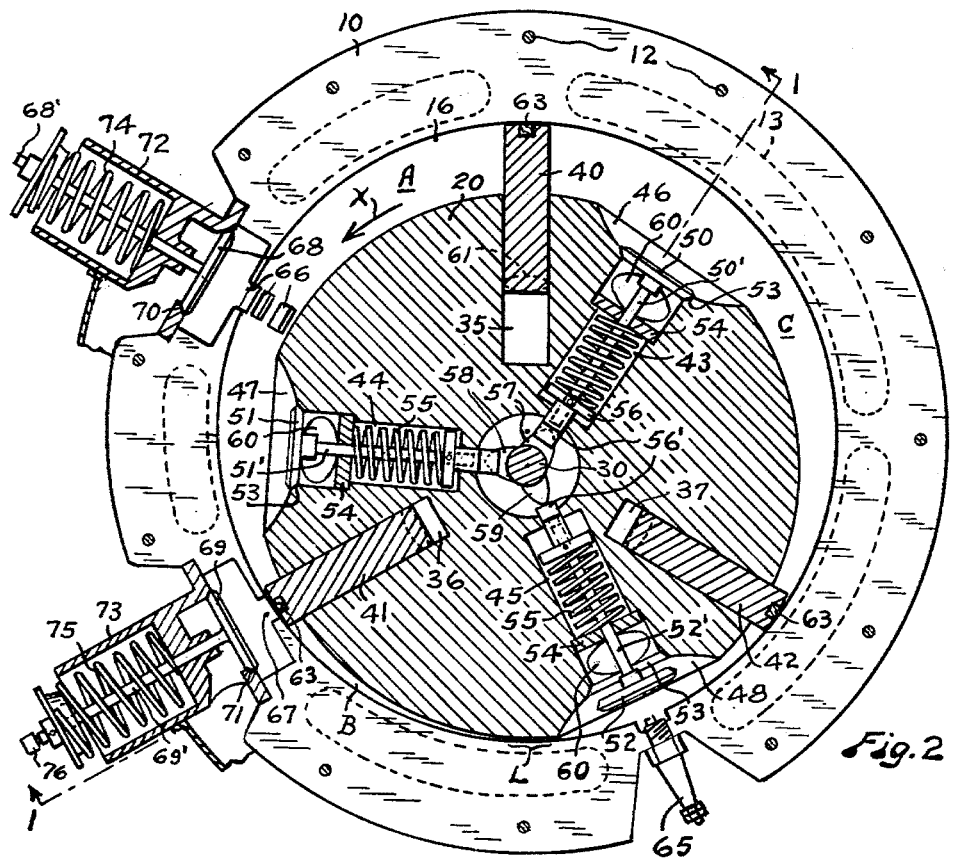
FIG. 2 is a view in section, taken substantially on broken line 2—2 of FIG. 1 and showing parts in elevation.
Figure 3:
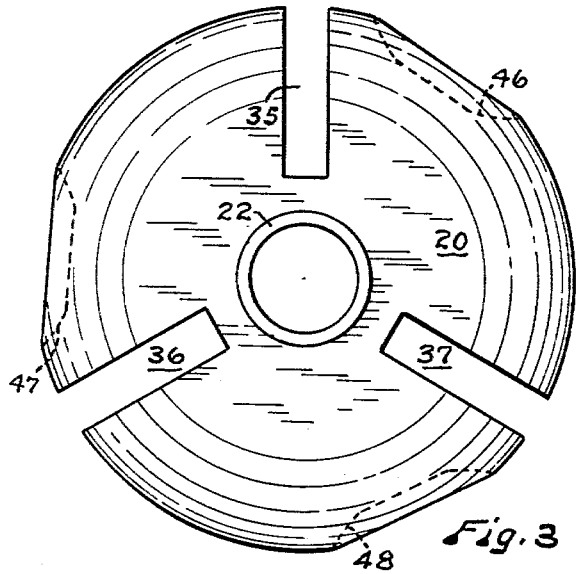
FIG. 3 is a detached view in side elevation of the rotor.

The tubular rotor shanks 21 and 22 are coaxial relative to the rotor 20 and relative to each other but the bearings 17 and 18 are off-center as respects the transverse axis of the rotor chamber 16 in housing members 10 and 11. This positions the rotor body 20 off-center in the rotor chamber 16 with the part of its periphery shown lowermost in FIG. 2 substantially in contact with the rotor chamber wall, as indicated at L, and the part of its periphery which is shown uppermost spaced a maximum distance from the wall of said rotor chamber 16.

The rotor body 20 is provided with preferably three equidistantly spaced radial vane-receiving notches 35, 36 and 37 extending from its periphery inwardly and within which three radially movable vanes 40, 41 and 42 respectively are disposed. The peripheral portion of the rotor is of semi-circular cross sectional shape, as shown in FIG. 1, to conform to the shape of the peripheral wall of the rotor chamber 16.

Said rotor body 20 is also provided with three tubular radial valve accommodation chambers 43, 44 and 45. The outer ends of the valve accommodation chambers 43, 44 and 45 terminate respectively in three arcuate recesses 46, 47 and 48 in the periphery of the rotor body 20, said recesses forming gas pockets in which explosion of the fuel charge occurs, as hereinafter explained. Three intake control valves 50, 51 and 52 are positioned in the respective recesses 46, 47 and 48 for opening and closing movement relative to intake valve seats 53. The intake valves 50, 51 and 52 are respectively provided with valve stems 50', 51' and 52' which extend inwardly through partition members 54 toward the axis of the rotor 20. The partition members 54 are threaded into or otherwise fixedly secured to the rotor body 20. A compression spring 55 exerts a yielding pressure on a collar 56 on each valve stem 50', 51' and 52' and urges the valve thereon into a closed position. Each collar 56 has an extension 56' which terminates in close proximity to the main shaft 30. Three cams 57, 58 and 59 are provided on the main shaft 30 and are positioned so that they will contact or be contacted by the extensions 56' on the respective valve stems 50, 51 and 52 so as to open and close the respective valves 50, 51 and 52 at the proper times in the cycle of operation of the engine.

The upper end portion of each valve chamber 43, 44 and 45 is communicatively connected by a passageway 60 in the rotor 20 and by the tubular rotor shank 21 with the carburetor 23. Each vane 40, 41 and 42 is radially movable in the rotor notch in which it operates. Each lateral edge of each vane 40, 41 and 42 is provided with a cam or lug 61 which operates in a cam groove or track 62 in the adjacent housing part. Obviously cam rollers can be used in place of the cam lugs 61. The cam grooves 62 are shaped so that they always keep the peripheral portions of the vanes 35, 36 and 37 in close proximity to the inner walls of the rotor chamber 16 but restrain said vanes from heavy frictional contact with these peripheral walls.

Preferably U-shaped seal members 63 are provided in the edges of the vanes 35, 36 and 37 to seal against the walls of the rotor chamber 16. The seal members 63 operate like piston rings.

Suitable fuel ignition means, such as a spark plug 65 is provided in the housing 10, 11 preferably a short distance in a counter-clockwise direction beyond the position marked L in FIG. 1, this being the position at which the periphery of the rotor 20 is closest to the internal wall of the rotor chamber 16. At position L rotor 20 is slightly spaced from from the housing wall to by-pass compressed fuel gases at this point.

Two spaced apart exhaust ports 66 and 67 are provided in housing 10, 11. Viewed as in FIG. 2 and FIGS. 4 to 7 the direction of rotation of the rotor 20 will be counter-clockwise, as indicated by arrow X, and exhaust ports 66 and 67 will be at the left with the port 66 spaced about sixty degrees and the port 67 about one hundred and twenty degrees from the uppermost point of the rotor chamber 16.

Two exhaust valves 68 and 69 respectively are secured to valve stems 68' and 69' and are movable into and out of seating engagement with valve seats 70 and 71. The exhaust valves 68 and 69 control the discharge of exhaust gases through the respective ports 66 and 67. The stems 68' and 69' are guided in housings 72 and 73 respectively and springs 74 and 75 on the respective stems 68' and 69' yieldingly urge said valves 68 and 69 into closed positions. Suitable valve control devices are provided and are operated from the main or cam shaft 30 for opening the exhaust valves 68 and 69 at the proper instants in the cycle of operation of the engine and for controlling the closing of said valves. As illustrative of devices for doing this FIG. 1 shows a tappet lever 76 pivotally supported by a bracket 77 which is rigid with the valve housing 73 and has one end portion positioned in engagement with an end of the valve stem 69'. The other end of the tappet lever 76 is engaged by a lifter rod 78 which extends slidably through a tubular bearing 80 in the gear housing 14 and is engaged.

The annular space between the external wall of the rotor 20 and the internal wall of the housing 10, 11 is always divided into three chambers A, B and C by the vanes 40, 41 and 42 and these chambers A, B and C expand and contract in size as the rotor rotates. A cycle of operation of the engine is completed in each two revolutions of the rotor 20. In each cycle of operation each chamber A, B and C becomes successively an expanding intake chamber, a contracting compression chamber, an expanding power chamber, and a contracting exhaust chamber, in accordance with a four cycle principle of operation. This insures substantially complete scavenging of the exhaust gases and uniformity in the fuel mixture.

Figure 4:
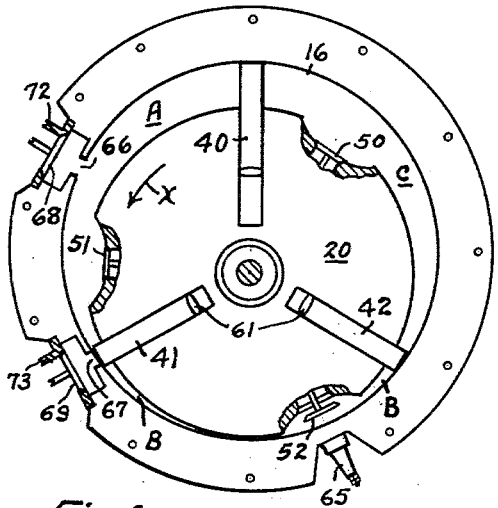
Figure 5:
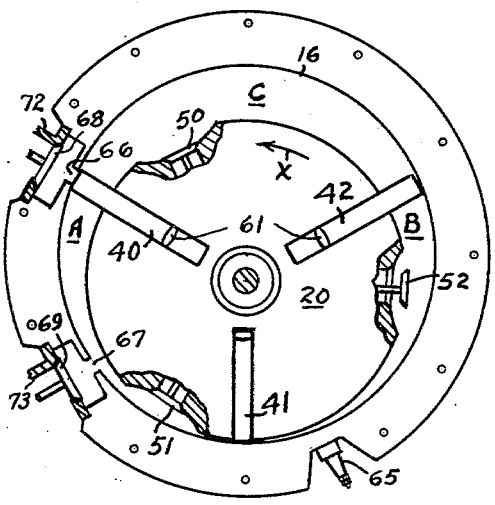
Figure 6:
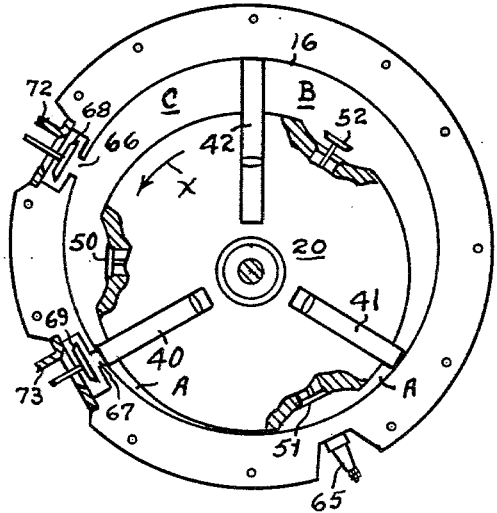
Figure 7:
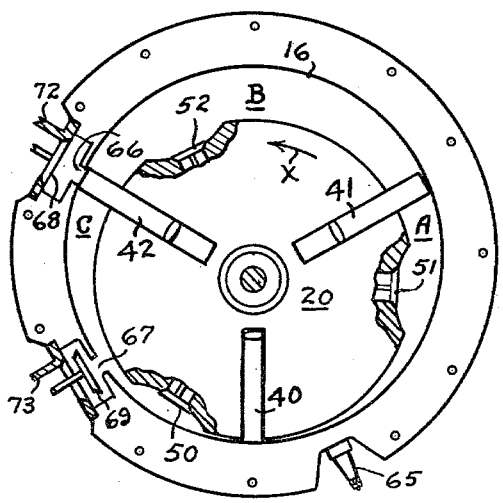

In describing the cycle of operation of this engine reference is made to FIGS. 4 to 7 inclusive and it is assumed that, in FIG. 4 the chamber B is at the end of its exhaust and has just started fuel intake through passageway controlled by valve 52. At this time chamber C is expanding and in its power phase and chamber A is contracting and compressing a fuel charge. Also at this time both exhaust valves 68 and 69 will be closed, intake valve 52 will be open and intake valves 50 and 51 will be closed. As the rotor advances counterclockwise, indicated by arrow X, the first sixty degrees, from the position shown in FIG. 4 to the position shown in FIG. 5, the exhaust valves 68 and 69 remain closed, the intake valve 52 remains open, chamber B expands and draws in fuel past valve 52, chamber A contracts and further compresses its charge, intake valves 50 and 51 remain closed, and chamber C continues to expand under pressure of burning gases therein and reaches its position of maximum expansion. As the rotor is advancing a second sixty degrees counterclockwise from the position shown in FIG. 5 to the position shown in FIG. 6, intake valves 50 and 51 remain closed, intake valve 52 remains open and intake continues in chamber B. During this sixty degrees of rotor movement exhaust valves 67 and 69 are both moved to an open position, contraction and exhaust occur in chamber C and contraction and compression continue in chamber A and said chamber A draws near to a firing position. As the rotor 20 is advancing counterclockwise a third sixty degrees from the position in which it is shown in FIG. 6 to the position shown in FIG. 7 exhaust valve 68 closes, exhaust valve 69 remains open, expansion and intake continue in chamber B, contraction and exhaust continue in chamber C, and shortly after the rotor passes the position in which it is shown in FIG. 6, ignition occurs in chamber A. The operation will continue in this manner, with fuel intake and combustion alternately taking place in each chamber A, B and C as it is moving upwardly at the right side of FIGS. 4 to 7 and exhaust and compression alternately taking place in each of said chambers as it is moving downwardly at the left side of these figures. Thus each chamber completes a cycle in each two revolutions of the rotor 20.

The foregoing description and accompanying drawings clearly disclose a preferred embodiment of my invention but it will be understood that changes in the same may be made within the scope of the following claims.

I claim:

1. In a rotary internal combustion engine, a housing having a cylindrical rotor chamber; two aligned bearings carried by opposite sides of said housing with their axes transversely offset a short distance to one side of the axis of said rotor chamber; a cylindrical rotor of smaller diameter than said rotor chamber disposed within said rotor chamber with its peripheral wall in close proximity to the peripheral wall of said rotor chamber at one point and spaced from the wall of said rotor chamber throughout the remainder of its circumference; two tubular axial bearing shanks rigid with said rotor and journaled in said bearings; a plurality of angularly spaced apart radially movable vanes carried by said rotor; a gas pocket provided in the periphery of said rotor between each two vanes; gaseous fuel supply means communicating with one of said tubular bearing shanks; conduits in said rotor, one of said conduits extending between each of said gas pockets and the tubular bearing shank which communicates with said gaseous fuel supply means; and intake control valve in each conduit controlling the flow of gaseous fuel to the gas pocket with which said conduit is connected; a cam shaft extending into the other tubular bearing shank; a gear secured to the shank of said rotor; a countershaft journaled in said housing; a gear on said countershaft meshing with the gear on said rotor shank; two other enmeshed gears providing a driving connection between said countershaft and said valve shaft, said gears and countershaft cooperating in driving said cam shaft at one half the angular velocity of said rotor; exhaust ports in said rotor housing; and a plurality of cams on said cam shaft with one of the cams controlling the movement of each intake valve and providing a complete cycle of opening and closing movement of the intake valve at each two revolutions of the rotor.

2. A rotary internal combustion engine comprising a housing having a cylindrical rotor chamber; two aligned bearings carried by opposite sides of said housing with their axes transversely offset a short distance to one side of the axis of said rotor chamber; a cylindrical rotor of smaller diameter than said rotor chamber disposed within said rotor chamber with its peripheral wall in close proximity to the peripheral wall of said rotor chamber at one point and spaced from the wall of said rotor chamber throughout the remainder of its circumference; two tubular axial bearing shanks rigid with said rotor and journaled in said bearings; a plurality of angularly spaced apart radially movable vanes carried by said rotor; a gas pocket provided in the periphery of said rotor between each two vanes; gaseous fuel supply means communicating with one of said tubular bearing shanks; conduits in said rotor, one of said conduits extending between each of said gas pockets and the tubular bearing shank which communicates with said gaseous fuel supply means; an intake control valve in each conduit controlling the flow of gaseous fuel to the gas pocket with which said conduit is connected; ignition means carried by said housing; at least one exhaust port in the wall of said housing; an exhaust control valve controlling the opening and closing of said exhaust port; a gearwheel secured to a shank of said rotor; a countershaft journaled in said housing; a gearwheel on said countershaft meshing with the gearwheel on said rotor shank; at least two other enmeshed gearwheels providing a driving connection between said countershaft and said valve shaft, said gearwheels and countershaft cooperating in driving said cam shaft at one half the angular velocity of said rotor and in the same direction as said rotor; and a plurality of intake and exhaust control cams on said cam shaft, one of said cams controlling the movement of each intake control valve and the exhaust control valve, said cams providing a complete cycle of opening and closing movement of each intake control valve and the said exhaust control valve at each two revolutions of the rotor, whereby four cycle operation of the engine is provided.

References Cited by the Examiner
UNITED STATES PATENTS

| | | | |
|---|---|---|---|
| 1,770,225 | 7/30 | Blackman | 123—16 |
| 2,118,253 | 5/38 | Larsen | 123—16 |
| 2,193,178 | 3/40 | Laythorpe | 123—16 |
| 2,215,232 | 9/40 | Reed | 123—16 |

KARL J. ALBRECHT, *Primary Examiner.*

JOSEPH H. BRANSON, Jr., *Examiner.*